United States Patent
Henkel et al.

(10) Patent No.: US 6,626,279 B2
(45) Date of Patent: Sep. 30, 2003

(54) PROCESS FOR SWITCHING BETWEEN MAIN SUPPLY AND A FREQUENCY INVERTER AND VICE VERSA FOR AN ESCALATOR DRIVE

(75) Inventors: Reinhard Henkel, Berlin (DE); Stefan Spannhake, Berlin (DE); Ralph Stripling, Berlin (DE); Richard Markus, Minden (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/130,121
(22) PCT Filed: Dec. 13, 2000
(86) PCT No.: PCT/US00/33744
§ 371 (c)(1), (2), (4) Date: May 15, 2002
(87) PCT Pub. No.: WO01/44083
PCT Pub. Date: Jun. 21, 2001

(65) Prior Publication Data
US 2002/0162726 A1 Nov. 7, 2002

(51) Int. Cl.$^7$ ............................................. B65G 17/00
(52) U.S. Cl. ...................................................... 198/322
(58) Field of Search .................. 198/321, 322, 198/323, 330

(56) References Cited

U.S. PATENT DOCUMENTS

| 4,631,467 A | 12/1986 | Herrmann et al. |
| 4,748,394 A | 5/1988 | Watanabe |
| 5,083,653 A * | 1/1992 | Sakata et al. ................ 198/322 |
| 5,099,977 A | 3/1992 | Hirose et al. |
| 5,704,464 A * | 1/1998 | Ahls et al. .................... 198/322 |
| 5,708,416 A * | 1/1998 | Zaharia et al. .......... 198/322 X |
| 5,785,165 A * | 7/1998 | Stahlhut et al. ............. 198/322 |
| 6,049,189 A | 7/1998 | Stahlhut et al. |
| 6,155,401 A | 12/2000 | Lunardi et al. |

* cited by examiner

Primary Examiner—James R. Bidwell

(57) ABSTRACT

A method of controlling the drive of conveyor installation which includes a drive motor (26) and a frequency converter (42) whose output is adjustable, between a load operation and an idle mode, in the form of an escalator (10) or a moving sidewalk, where: in the load operation mode drive motor (26) is supplied with a line voltage at an essentially constant line frequency ($f_{Netz}$), and in the idle mode with an output voltage of the frequency converter (42); the line voltage and the frequency converter's output voltage are compared with respect to frequency and phase position; the frequency converter (42) is set for an output frequency which has a predetermined spacing ($\Delta f_{up}$, $\Delta f_{down}$) from the line frequency ($f_{Netz}$); a demand to switch modes is signalled by a conveyance signal generator (48); and at the point in time ($t_1$, $t_4$), after a demand to switch modes has been signalled, when the output frequency of the converter (42) has reached the predetermined frequency spacing ($\Delta f_{up}$, $\Delta f_{down}$) from the line frequency ($f_{Netz}$), and a predetermined phase spacing has been achieved between the frequency converter's output voltage and the line frequency ($f_{Netz}$), a switch-over signal (58) is emitted to switch the drive motor (26) between the frequency converter supply and the line supply.

22 Claims, 6 Drawing Sheets

PROCESS FOR SWITCHING BETWEEN MAIN SUPPLY AND A FREQUENCY INVERTER AND VICE VERSA FOR AN ESCALATOR DRIVE

TECHNICAL FIELD

The invention concerns a device and a method of controlling the drive of a conveyor installation in the form of an escalator or a moving sidewalk, which can be switched between the load and the idle operation mode. This conveyor installation comprises a line voltage connection which supplies an essentially constant line frequency, an electric drive motor, particularly in the form of an induction or a synchronous motor, and a conveyance demand signal generator that signals a demand to switch operation modes.

BACKGROUND ART

A typical conveyor installation in the form of an escalator or a moving sidewalk for transporting passengers comprises a number of closely adjacent tread plates in the form of an endless band which are moved in the desired direction by the drive motor.

To reduce the power consumption and the wear of such conveyor installations, they now move only when conveyance is needed, otherwise they are brought to a standstill. To that end a conveyance demand signal generator is provided, for example in the form of a tread plate, a photosensitive relay or a manually activated switch, whereby the existence of a conveyance demand can be determined. If there is a conveyance demand, for example because a passenger has stepped on the tread plate, the conveyor installation goes into the conveyance mode for a predetermined period of time, and is then switched off if no further conveyance demand has been determined within a predetermined period of time.

To avoid peak loads during frequent on and off switching of the conveyor installation, it is known from WO 98/18711 not to switch the drive motor abruptly on and off, but to allow its RPM to increase or decrease linearly when switching. Such conveyor installations predominantly use induction motors. Since the RPM of an induction motor depends on the frequency of the supplied alternating voltage, which in the case of the direct supply from an alternating voltage network with constant line frequency means a constant RPM of the induction motor, a controllable frequency converter is used whereby the supplied line frequency can be converted in a controllable manner into an output frequency which differs from the line frequency.

The cost of a frequency converter which also supplies the drive motor of an escalator or a moving sidewalk in the load operation mode is high, since it increases enormously with the output power that a frequency converter must be able to produce.

To lower the acquisition and operation costs, WO 98/18711 provides that the conveyor installation only moves at full conveyance speed in the load operation mode, and that in the stand-by or idle mode when no conveyance is required, it only operates at a reduced idle operation speed, and the frequency converter only supplies the drive motor during idle mode and switch-over processes, while it is directly supplied by the line voltage source in the load operation mode. This creates the possibility of designing the maximum output of the frequency converter to be much lower, which leads to considerable cost savings as compared to a frequency converter whose maximum output is adapted to the conveyor installation's load operation. If no further conveyance demand is signalled after a conveyance order has been carried out, the conveyor installation in WO 98/18711 first changes into the idle mode, and only goes into standstill if no new conveyance demand is signalled during a predetermined period of time since the change-over to the idle mode.

The cited measures have achieved a considerable reduction in load peaks and abrupt speed changes of the conveyor installation. However, high transition currents can always occur when changing between the line supply and the frequency converter supply of the drive motor, namely due to the drive motor's own characteristic voltage which can overload the frequency converter and cause jerky movements of the conveyor installation. The present invention will overcome such events.

DISCLOSURE OF INVENTION

This is achieved with a method according to the invention as claimed in claim 1, and a device according to the invention as claimed in claim 11, where further developments of the method or the device are indicated in the dependent claims.

SUMMARY OF INVENTION

The method of the invention as well, the drive motor in the load operation mode is supplied with a line voltage, and in the idle mode with an output voltage of a frequency converter. To achieve the target of the invention, the line voltage and the frequency converter's output voltage are compared with respect to frequency and phase position, and the frequency converter is set to an output frequency which has a predetermined spacing from the line frequency. If a conveyance signal generator signals a demand for a switch-over of the conveyor installation from load to idle mode or vice versa, at the point in time after the demand to change the mode was signalled, when the output frequency of the converter has the same spacing with respect to the line frequency and has also reached a predetermined phase spacing between the output frequency of the converter and the line frequency, a signal is produced which triggers the switch-over of the drive motor between the frequency converter supply and the line supply.

The switching devices used to switch between the line supply and the frequency converter supply, usually contactors, are not delay-free on the one hand, and on the other require a zero current time between the turn-off of one contactor and the activation of the other in order to prevent a short circuit in the line through the frequency converter. There is a certain inherent reaction delay between the production of a switch-over signal and the previously conducting contactor turning off, and finally the activation of the other contactor, which depends on the special components of the special conveyor installation.

A smooth transition between the frequency converter supply and the line supply and vice versa can therefore not be achieved by monitoring the line voltage and the frequency converter's output voltage for a match in the frequency and phase position, and by producing a switch-over signal at the time when such a match is determined. By the time the inherent reaction delay actually produces a switch-over, a frequency and phase deviation would already have occurred and no smooth transition could take place between the line supply and the frequency converter supply.

The invention therefore produces a switch-over process "in advance", i.e. it plans the reaction delay and the frequency and phase changes that occur during the reaction delay between the line frequency and the output frequency of the converter. To that end it determines in a special conveyor installation the inherent reaction delay, the frequency change in the motor voltage which occurs during the reaction delay, and the change in the phase difference between the line frequency and the output frequency of the converter which occurs during the reaction delay, and produces the switch-over control signal at a time in advance, when a predetermined frequency spacing as well as a predetermined phase spacing exist between the line voltage and the frequency converter's output voltage. The frequency and phase match needed for a smooth switch-over is then available at the end of the reaction delay.

The sign of the predetermined frequency spacing depends on the switch-over direction. Due to inherent friction losses in the conveyor installation, the motor RPM decreases during the zero current time when the drive motor is not supplied by either the line or the frequency converter. Since we start with a constant line frequency, which the motor RPM must match at the end of a switch-over process, the predetermined frequency spacing of the converter's output voltage is above the line frequency when the frequency converter supply is switched over, and it is under the line frequency when the line supply is switched over to the frequency converter supply.

The method of the invention can be carried out with an electric controller for controlling the drive of a conveyor installation in the form of an escalator or a moving sidewalk that can be switched between a load and an idle operation mode, which has a line voltage connection with an essentially constant line frequency, a drive motor and a conveyance signal generator which signals a mode switch-over demand, where the controller has a frequency converter whose output frequency can be set, and a controllable switch-over installation with a load operation circuit where the drive motor is directly coupled to the line voltage connection, and an idle mode circuit where the drive motor is coupled to the line voltage connection via the frequency converter, and a synchronizer whereby the converter's output frequency can be set, where the output voltages of the line voltage connection and frequency converter are comparable with respect to frequency and phase position, the frequency converter can be set to an output frequency with a predetermined spacing from the line frequency, and a signal can be sent to the switch-over installation after a mode switching demand has been signalled, when the converter's output frequency has both the predetermined spacing to the line frequency, and has reached a predetermined phase spacing between the output voltages of the frequency converter and the line voltage connection.

In a preferred configuration of the invention, each of the switching devices in the switch-over installation is a contactor. Contactors that are designed for a switching capacity, as needed in conjunction with escalators or moving sidewalks, usually have an inherent switch-off delay between the reception of a switch-off signal and the actual transition into the non-conducting mode, and an inherent activation delay between the reception of a switch-on signal and the actual transition into the conducting mode. In this case the inherent reaction delay of the switch-over installation is composed of the delay in releasing the until now conducting contactor, the zero current time during which no power is supplied to the drive motor, and the activation delay of the until now non-conducting contactor.

The predetermined frequency spacing and the predetermined phase spacing of line voltage and frequency converter's output voltage, which must occur at the time when the switch-over signal is produced, are empirically determined on the basis of the respective zero current time, and possibly the respective switch-off delay in a practical conveyor installation configuration. To that end it is determined to what degree the frequency and phase position of the drive motor's terminal voltage changes during the zero current time, and how long the turn-off delay is. The result is the point in time when the switch-over signal must be produced so that at the time when the switching installation becomes conductive, there is at least an essential match with repect to frequency and phase position between the voltage at the motor terminal and the motor supply source connected to this switching installation.

In order to take the decrease in the drive motor's RPM during the respective zero current time into consideration, the converter's output frequency is set for a predetermined frequency spacing above or below the line frequency, depending on whether the conveyor installation operates in the load or in the idle mode. In both cases the frequency spacing is chosen so that it corresponds to the decrease in the frequency of the motor terminal voltage during the zero current time of the respective switch-over process.

In conjunction with the switch-over processes, one configuration of the invention provides for the converter's output frequency to be set with a rising or a declining slope. Outside of such slopes the converter's output frequency is preferably set for the predetermined frequency spacing as opposed to the line frequency. A two-point adjustment can be used to that end. To rapidly reach the final load RPM of the drive motor on the one hand, and to obtain a short adjusting process when switching over from the standstill to the load operation on the other hand, one configuration provides that the converter's output frequency is set with a steeper slope on a first ramp part that lies at a predetermined spacing under the line frequency, and it is set with a flatter slope when it reaches this spacing.

One controller of the invention has a switch-over installation for switching between the load and the idle mode, which preferably contains two contactors, and a synchronizer whereby the converter's output frequency can be set, where the line voltage and converter's output frequencies are comparable with respect to frequency and phase position, where the frequency converter can be set for the predetermined spacing from the line frequency, and a switch-over signal can be sent at the time after a demand to switch modes has been signalled, when the frequency converter's output frequency has both the predetermined spacing to the line frequency, and a predetermined phase spacing has been achieved between the output voltages of the frequency converter and the line voltage.

BEST MODE FOR CARRYING OUT THE INVENTION

Figure 1:
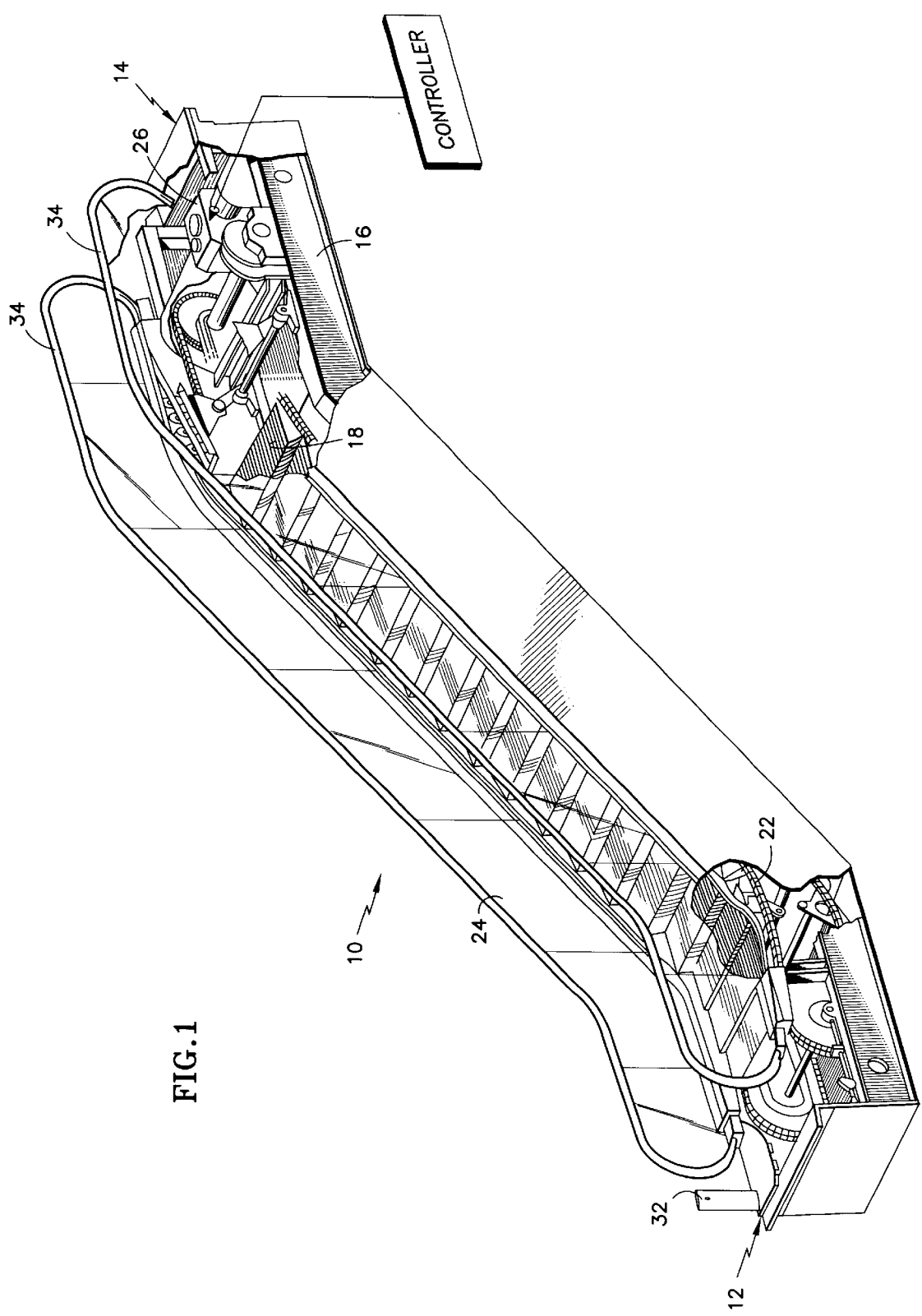
FIG. 1 a partially cut, perspective view of an escalator.

An escalator as shown in a partially cut, perspective view in FIG. 1, is the example of a conveyor installation according to the invention.

The escalator 10 in FIG. 1 comprises a lower landing 12, an upper landing 14, a framework 16, a number of successively aligned tread plates 18 which form an endless band, a drag chain 22 for driving the tread plates 18, a pair of balustrades 24 that extend on both sides of the aligned tread plates 18, a drive motor 26 which is drive-coupled to the drag chain 22, a controller 28 which works with the drive motor 26, and a conveyance demand signal generator in the form of a passenger sensor 32, which may be a photosensitive relay for example. The tread plates 18 form the platforms for conveying passengers between the two landings 12 and 14. Each of the two balustrades 24 comprises a moveable handrail 34 which is driven at the same speed as the tread plates 18. The controller 28 determines the electric power supplied to the drive motor 26 and in this way controls the RPM of the drive motor 26 and thus the moving speed of the tread plates 18.

Figure 2:
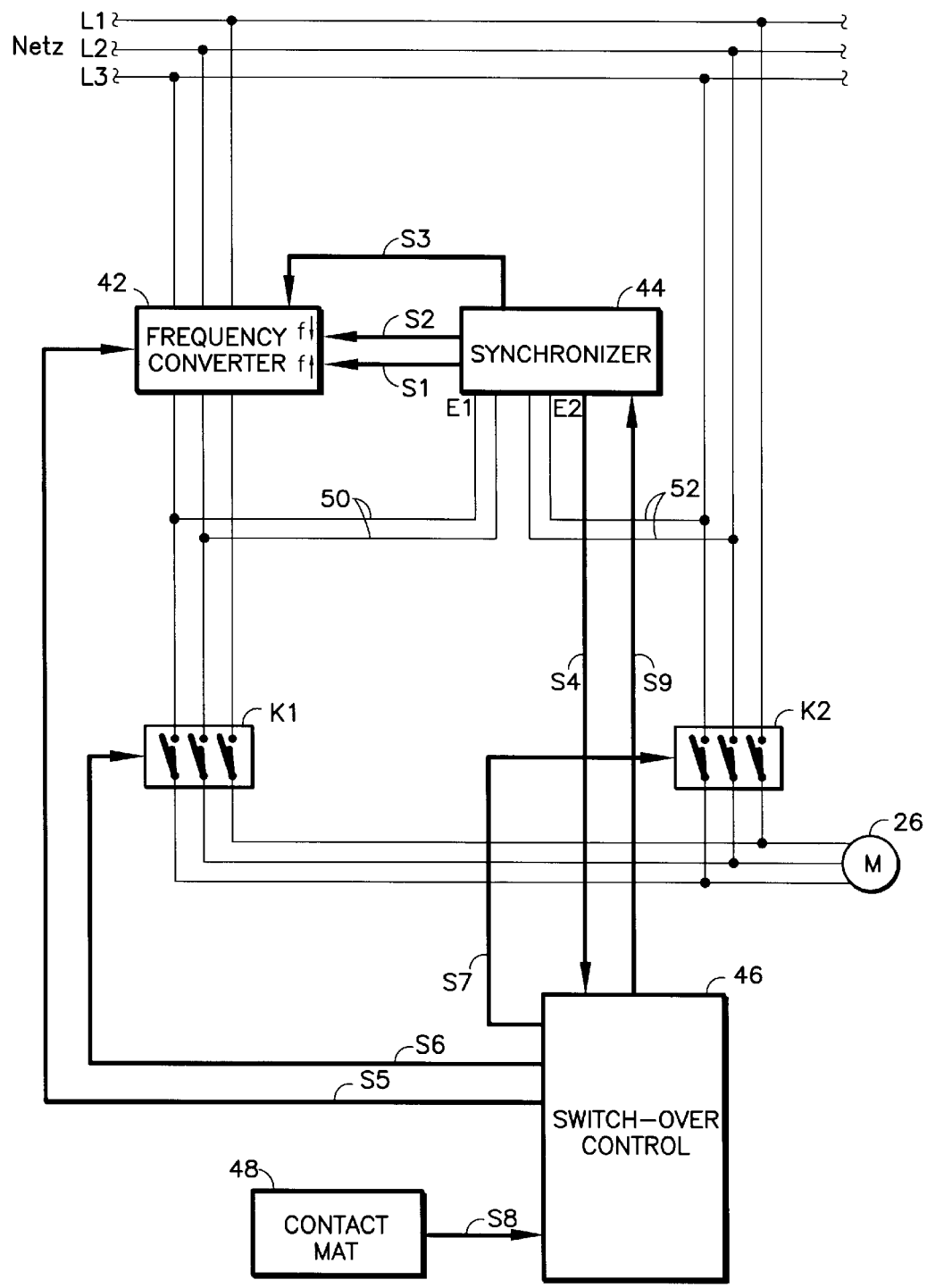
FIG. 2 an electric circuit diagram in partial block form, with a controller according to the invention.

FIG. 2 is an electric circuit diagram with the configuration of a controller according to the invention. It comprises a frequency converter 42, a synchronizer 44, a first contactor K1, a second contactor K2, a switch-over control 46 and a contact mat 48 which is used as the conveyance demand signal generator. The entire circuit arrangement has a three-phase design and is supplied by a three-phase a.c. network with three phase lines L1, L2 and L3.

The input side of the frequency converter 42 is connected to the three network lines L1–L3. The drive motor 26 is connected to the output side of the frequency converter 42 by the contactor K1, and to the lines L1–L3 by the contactor K2. Three control lines S1, S2 and S3 lead from the synchronizer 44 to the control inputs of the frequency converter 42. In addition a control line S4 leads from the synchronizer 44 to a control input of the switch-over control 46. A control line S5 leads from the switch-over control 46 to another control input of the frequency converter 42, a control line S6 leads to a control input of contactor K1, and a control line S7 to a control input of contactor K2. A control line S8 leads from the contact mat 48 to a control input of switch-over control 46. A control line S9 leads from the switch-over control 46 to a control input of the synchronizer 44.

The control lines S5, S6 and S7 conduct ON/OFF control signals to the frequency converter 42 or to the contactor K1 or K2. The control line S3 conducts a ramp control signal from the synchronizer 44 to the frequency converter 42. The control line S4 conducts a switch-over pulse from the synchronizer 44 to the switch-over control 46. The control line S8 conducts a conveyance demand signal from the contact mat 48 to switch-over control 46.

The switch-over control 46 preferably contains a microprocessor whereby the frequency converter 42 and the two contactors K1 and K2 can be switched as a function of a conveyance demand signal received from the contact mat 48, or a switch-over signal from the synchronizer 44.

The synchronizer 44 controls a rise or a decrease of the output frequency f of converter 42 via control lines S1 and S2, namely as a function of a control signal sent to the synchronizer 44 via the control line S9. Measurement inputs E1 and E2 of the synchronizer 44 are connected by a pair of lines 50 or a pair of lines 52 to two output lines of the frequency converter 42, or to two corresponding network lines. The measurement inputs E1 and E2 are used to measure the phase position and frequency of a network phase, and the frequency and phase position of a corresponding phase on the frequency converter's output side. The synchronizer 44 comprises a comparator which is connected to the measurement inputs E1 and E2, whereby the line voltage and the output voltage of the frequency converter can be compared with each other in regard to frequency and phase position.

The synchronixer 44 in one configuration of the invention uses a specially adapted synchronization relay from the Danish company DEIF with the part identification number GAS-113DG.

The following parameters must be taken into account for the point in time when the switch-over pulse is emitted:

a) The inherent delay between the appearance of the switch-over pulse and the emission of the shut-off signal to the contactor to become non-conducting;

b) The inherent delay of a contactor between receiving the shut-off signal and switching over to the non-conducting mode;

c) The inherent delay forming the zero current time between the switch-over of one contactor into the non-conducting mode, and the switch-over of the other contactor into the conducting mode;

d) The inherent delay of a contactor between receiving the switch-on signal and being switched over into the conducting mode;

e) The decrease in RPM of the drive motor due to the inherent friction of the conveyor installation during the zero current time, when the drive motor is neither supplied by the network or the frequency converter;

f) The terminal voltage of the drive motor, whose phase position and amplitude depend on the motor time constant and the time required for the switch-over. If an induction motor is used as the drive motor, another parameter is:

g) The drive motor's slippage.

All of these parameters can be empirically determined for a special conveyor installation. It allows to determine the predetermined spacing with respect to the line frequency, for which the output frequency of converter 42 must be adjusted, and the point in time when the switch-over pulse must be emitted to have the previously non-conducting contactor start conducting, and to determine the frequency and phase match between the line voltage and the motor terminal voltage.

The synchronizer 44 is used to set the output frequency of converter 42 to the predetermined spacing with respect to the line frequency, and the occurrence of the predetermined phase spacing is established by determining the phase difference between the measured line phase and the corresponding phase of the frequency converter 42. A switch-over pulse is provided by the synchronizer 44 when the following two conditions have been met:

1. The output frequency of the converter 42 is within a defined tolerance range in the predetermined spacing from the line frequency; and 2. The phase angle between the monitored network phase and the corresponding phase of the frequency converter 42 goes to zero after a determinable time following the emission of the switch-over pulse.

Since it can be determined how much time is required for a certain phase position change in a special conveyor installation, the lead time required by the switch-over pulse to reach the desired match in the phase positions can be determined.

Figure 3:
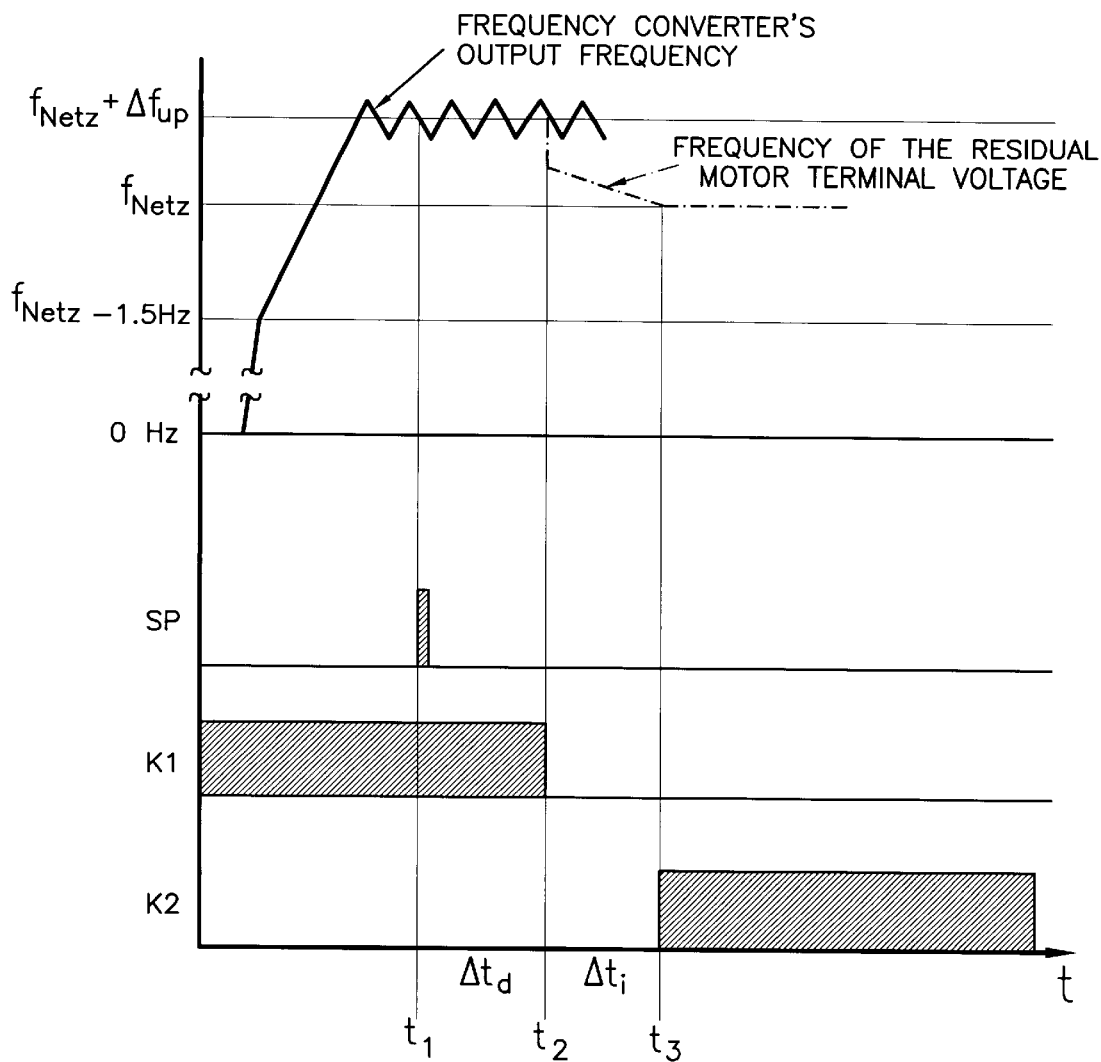
FIG. 3 a time diagram of processes in connection with a switch-over from a standstill to a load mode.
Figure 4:
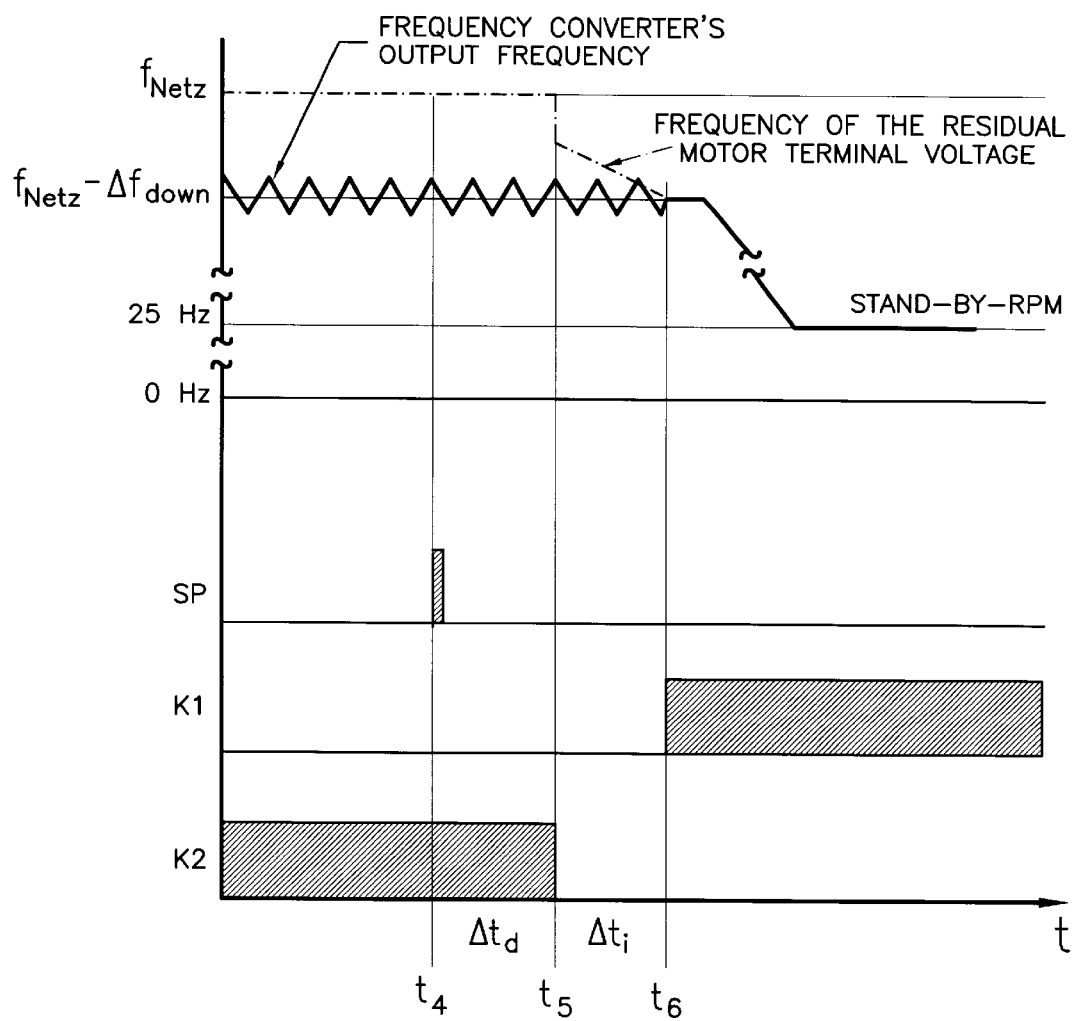
FIG. 4 a time diagram of processes in connection with a switch-over from load to idle mode.

A more precise operation of the circuit diagram in FIG. 2 is now described in greater detail by means of FIGS. 3 and 4. FIG. 3 shows the switch-over process from standstill to load operation, while FIG. 4 shows the switch-over process from load to idle or stand-by mode. Both figures show frequency courses, the switching modes of contactors K1 and K2, and the occurrence of a switch-over pulse SP as a function of time. In FIGS. 3 and 4 $f_{Netz}$ means the line frequency, $\Delta f_{up}$ a predetermined frequency spacing above $f_{Netz}$, and $\Delta_{down}$ a predetermined frequency spacing under $f_{Netz}$.

The conveyor installation's switch-over processes from standstill to load operation are considered first by means of FIGS. 3. After the conveyor installation is switched on by a conveyance demand signal from the contact mat 48, the drive motor 26 is supplied from the frequency converter 42 via the conducting contactor K1, and is accelerated by the stator's rotating field in accordance with the two-stage rising slope of the output frequency of converter 42 shown in FIG. 3. Next a stronger acceleration takes place according to the first steeper part of the slope from 0 Hz to $F_{Netz}$–1.5 Hz, followed by a slower acceleration of $F_{Netz}$–1.5 Hz beyond $F_{Netz}$ to $F_{Netz}+\Delta f_{up}$.

The line frequency changes are compensated because the synchronizer 44 continuously measures the line frequency and thereby orients itself for setting the output frequency of the converter 42.

Once all the conditions for the synchronization have been met, meaning that the output frequency of the converter 42 is $f_{Netz}+\Delta f_{up}$, and a 0 phase variation has been obtained from the sum of the inherent switch-off delay time $\Delta t_d$ and the zero current time $\Delta t_i$, the switch-over pulse is produced at time $t_1$. After the inherent switch-off delay $\Delta t_d$ of contactor K1 at time $t_2$, the contactor K1 changes from the conducting into the non-conducting mode and the drive motor 26 switches into the zero current mode. The motor voltage frequency decreases abruptly according to the natural slippage of an induction machine. The motor voltage frequency then decreases due to friction losses in the drive motor 26 and in the conveyor installation. Since $\Delta f_{up}$ was chosen while considering the slippage and the decreased frequency of the motor terminal voltage, the latter ends up at time $t_3$, when the contactor K2 switches into the conducting mode and the drive motor 26 is now supplied from the contactor K2 with the line frequency $f_{Netz}$.

The currents inside the stator winding of drive motor 26 are zero once the drive motor 26 is separated from the frequency converter 42. However, there is still a magnetic field. This magnetic field induces a residual voltage in the stator winding, which decreases exponentially as the time increases. Due to the large time constants of the drive motors used for conveyor installations, the residual voltage is still high when power is again supplied to the drive motor 26.

At time $t_3$ the contactor K2 switches into the conducting mode and the drive motor 26 is connected to the network so that it can now operate under full load condition.

The frequency spacing $\Delta f_{up}$ of the output frequency of the converter 42 compensates for the abrupt decrease in the frequency of the motor terminal voltage due to the motor slippage and the decrease in the frequency of the motor terminal voltage due to friction losses.

A certain phase shift occurs between the line voltage and the residual voltage at the motor terminals due to the time delay between $t_1$ and $t_3$. This phase shift is taken into consideration to avoid high transition currents after the contactor K2 switches into the conducting mode. For that reason the switch-over pulse is not produced at the time when there is an exact match between the phases of the line voltage and the motor terminal voltage, but rather with a predetermined lead time before the time when the drive motor begins to receive line power.

The switch-over process from load to idle mode shown in FIG. 4 is similar to the switch-over process shown in FIG. 3, if no new conveyance demand has been signalled for a predetermined length of time. The main difference is that prior to the switch-over process, the output frequency of converter 42 is adjusted to a predetermined frequency spacing $\Delta f_{down}$ under the $f_{Netz}$ line frequency. The switch-over of the output frequency of converter 42 to this output frequency takes place for example after a certain time has passed since the last conveyance demand signal.

The frequency spacing $\Delta f_{down}$ corresponds to the decrease in frequency with respect to the $f_{Netz}$ line which takes place in the motor terminal voltage during the zero current time $\Delta t_i$. In the usual case where identical contactors are used for K1 and K2, both the inherent switch-off delay $\Delta t_d$ and the zero current time $\Delta t_i$ are the same as in FIG. 3. The lead time between time $t_4$ when the switch-over pulse is produced, and time $t_6$ when the contactor K2 switches from the non-conducting into the conducting mode, is therefore the same as in FIG. 3.

After the drive motor 26 is switched over to the frequency converter supply, the output frequency of the converter 42 and thus the frequency of the rotating field in the drive motor's stator decreases to 25 Hz, as shown in the example of FIG. 4. The speed of the conveyor installation during the thus obtained idle mode is then half that of the load operation.

The idle mode can now be maintained for any length of time until a new conveyance demand is signalled. However the conveyor installation can be switched off altogether to the standstill mode, if no new conveyance demand is signalled within a predetermined length of time after the idle mode is reached.

Figure 5A:
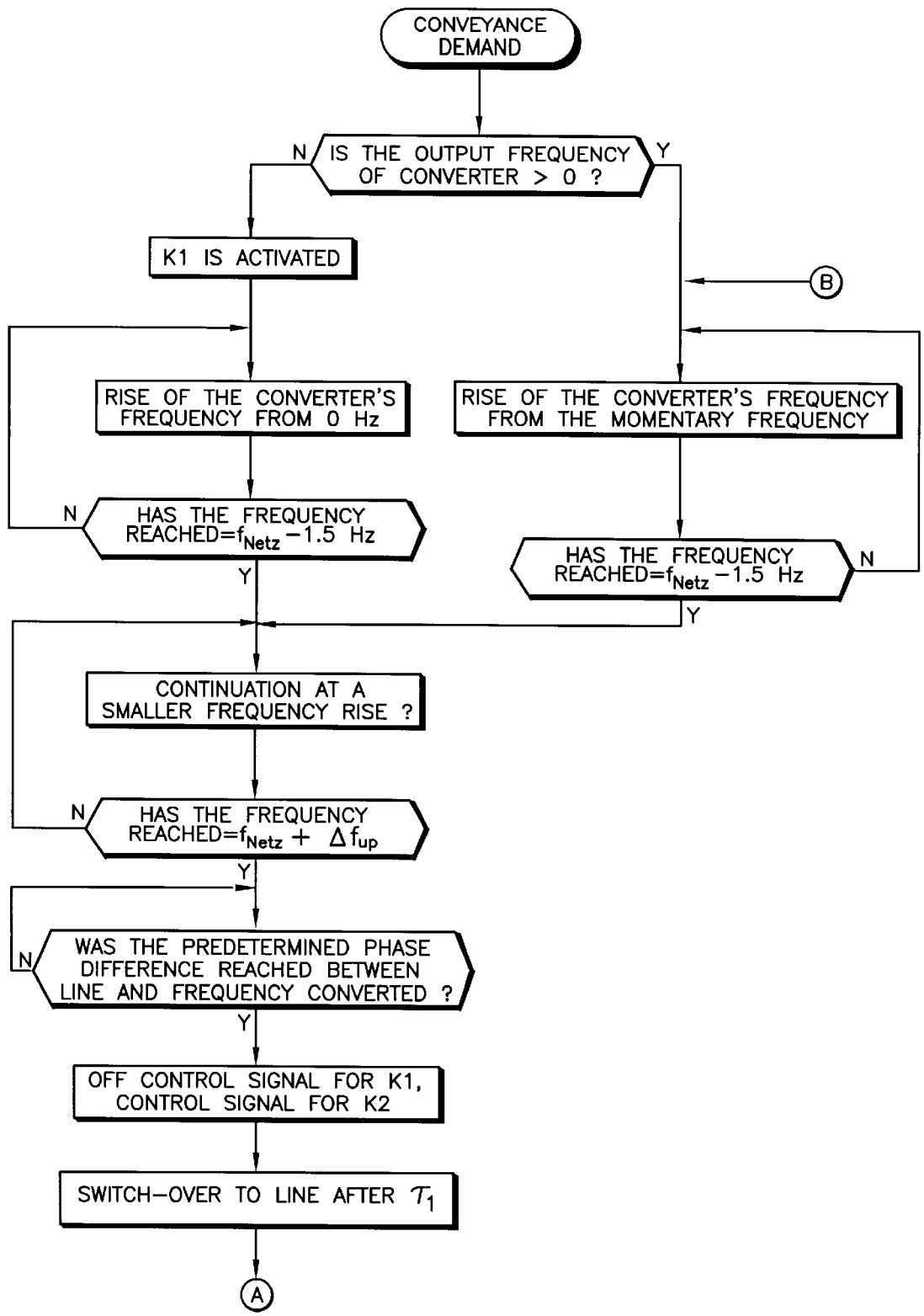
FIGS. 5a and 5b a flow diagram of a control process according to the invention.
Figure 5B:
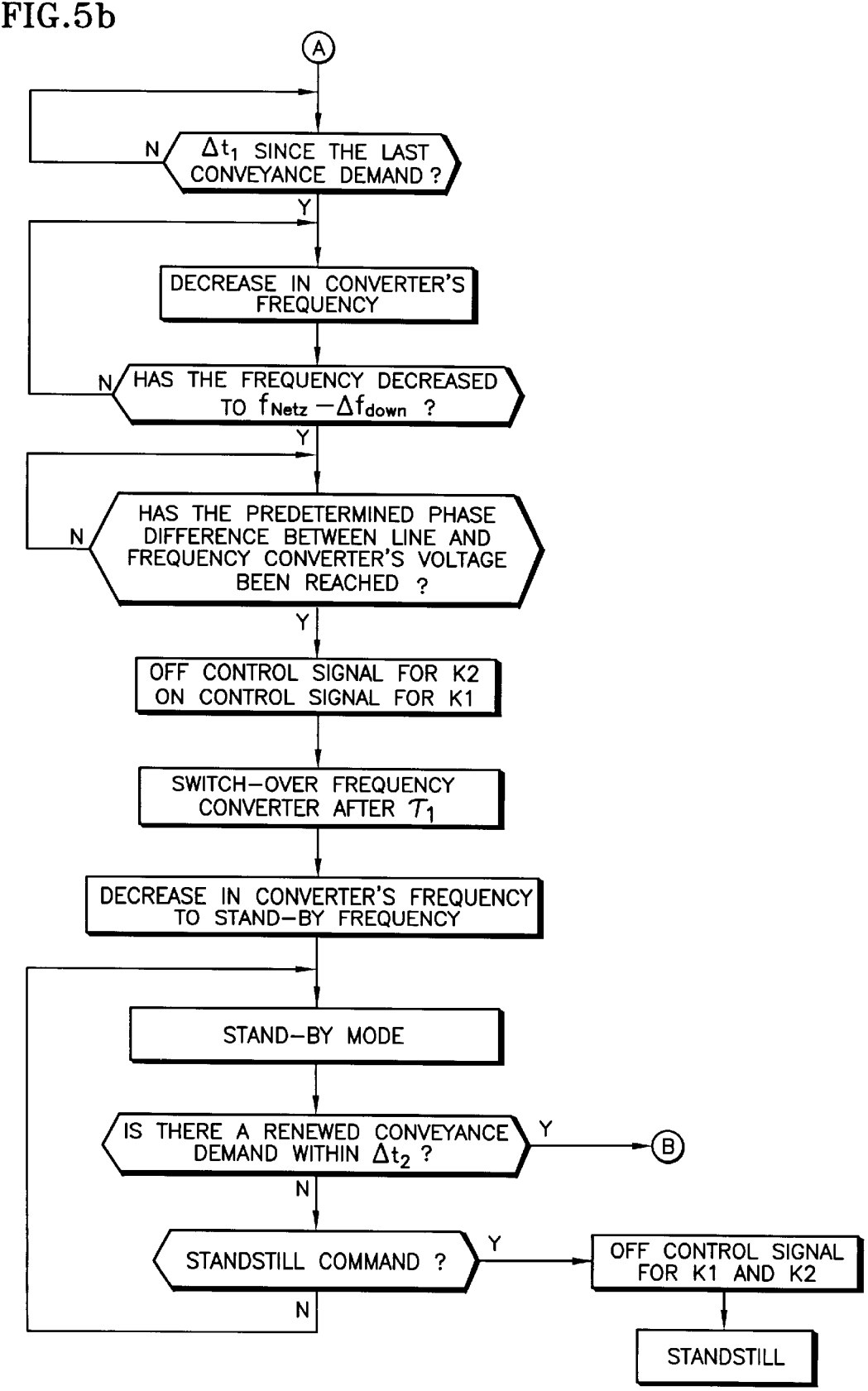

FIGS. 5a and 5b illustrate the entire operation of a conveyor installation of the invention in the form of a flow diagram. The flow diagram begins with the fact that the conveyor installation is not in the load operation but in the standstill mode (the output frequency of the converter is zero), or in the idle or stand-by mode (the output frequency of the converter is greater than zero). Depending on whether the conveyor installation is in the standstill or in the idle mode at the time the conveyance demand is signalled, the contactor K1 is activated or remains activated and starts an increase in the frequency of the converter from 0 Hz or from its momentary frequency. The synchronizer 44 is used to check whether the momentary frequency of the converter is under or above $f_{Netz}$–1.5 Hz. As shown in FIG. 3, in the former case the synchronizer 44 sets a higher frequency increase, and in the latter case a lower increase. This frequency increase continues until the synchronizer 44 determines that the frequency $f_{Netz}+\Delta f_{up}$ has been reached. When this happens the synchronizer 44 checks whether the predetermined phase difference between the line voltage and the output voltage of the frequency converter 42 has been reached, when the switch-over pulse must be emitted. The emission of the switch-over pulse SP when the predetermined phase difference is reached sends an OFF signal to contactor K1, and an ON signal to contactor K2. After another time $\tau_1$, which corresponds to the sum of the inherent switch-off delay time $\Delta t_d$ and the zero current time $\Delta t_i$, the contactor K2 switches into the conducting mode, the drive motor 26 receives power from the line, and the conveyor's load mode is reached.

A check in the top part of the flow diagram in FIG. 5b determines whether a new conveyance demand signal was received within a predetrmined time $\Delta t_1$ since the change to the load mode. In that case the synchronizer 44 decreases the frequency of the converter 42 to $f_{Netz}-\Delta_{down}$. Once this decrease has been reached and the synchronizer 44 now finds that a predetermined phase difference has been reached between the line frequency and the converter voltage, it emits a switch-over pulse which leads to the production of an OFF signal for K2 and an ON signal for K1. At a time $\tau_2$ after the production of the switch-over pulse, the contactor K1 switches into the conducting mode and begins to supply the drive motor 26 through the frequency converter 42 (time $t_6$). The synchronizer 44 then produces a decrease in the converter frequency to the stand-by frequency (25 Hz in FIG. 4). If another conveyance demand signal is received within time $\Delta t_2$, the frequency of the converter is again increased from its idle mode frequency (25 Hz). If no new conveyance demand signal is received within time $\Delta t_2$, a check determines whether or not there is a command to switch the conveyor installation into the standstill mode. If there is such a command, an OFF signal is sent to K1 as well as K2, whereupon both contactors K1 and K2 turn off, meaning they switch into the non-conducting mode, and the drive motor 26 no longer contains any current.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of controlling the drive of a conveyor installation in the form of an escalator (10) or a moving sidewalk between a load and an idle mode, which comprises a drive motor (26) and a frequency converter (42) whose output is controllable, where:

in the load operation mode the drive motor (26) is supplied with a line voltage at an essentially constant line frequency ($f_{Netz}$), and in the idle mode with an output voltage from the frequency converter (42);

the line voltage and the frequency converter's output voltage are compared with respect to frequency and phase position;

the frequency converter (42) is adjusted for an output frequency which has a predetermined spacing ($\Delta f_{up}$, $\Delta f_{down}$) from the line frequency ($f_{Netz}$);

a demand to switch over the mode is signalled by a conveyance signal generator (48);

and at the point in time ($t_1$, $t_4$) after a demand to switch modes has been signalled, when the output frequency of the converter (42) has reached both the predetermined frequency spacing ($\Delta f_{up}$, $\Delta f_{down}$) from the line frequency ($f_{Netz}$), and a predetermined phase spacing between the frequency converter's output voltage and the line frequency ($f_{Netz}$), a switch-over signal (58) is emitted which switches the drive motor (26) between the frequency converter supply and the line supply.

2. A method as claimed in claim 1, where the drive motor (26) operates without current during a predetermined zero current time ($\Delta t_1$) before the switch-over between line supply and frequency converter supply takes place.

3. A method as claimed in claim 2, where the switch-over signal (SP) is emitted with a lead time before the time ($t_3$, $t_6$), which corresponds to the zero current time ($\Delta t_1$) when a switch-over between the frequency converter supply and the line supply must take place.

4. A method as claimed in claim 2 for controlling a conveyor installation, where the switch-over takes place by means of a switch-over installation (K1, K2) with an inherent switch-off delay ($\Delta t_d$) with respect to time ($t_1$, $t_4$) when the switch-over signal (SP) is received, where a switch-over is ordered between the frequency converter supply and the line supply, with a lead time with respect to time ($t_3$, $t_6$) which corresponds to the sum of the switch-off delay time ($\Delta t_d$) and the zero current time ($\Delta t_i$), when a switch-over between frequency converter supply and line supply must take place.

5. A method as claimed in claim 2, where the output frequency of the converter (42) is set for a frequency spacing ($\Delta f_{up}$, $\Delta f_{down}$) with respect to the line frequency ($f_{Netz}$) which corresponds to the decrease in RPM of the drive motor (26) during the respective zero current time ($\Delta t_i$).

6. A method as claimed in claim 4, where a value which corresponds to the phase change in the motor terminal voltage during the lead time is used as the predetermined phase spacing, so that at the end of the lead time an essential match is obtained between the phase positions of the motor terminal voltage and the frequency converter's output voltage.

7. A method as claimed in claim 1, where during a switch-over from the load to the idle mode the output frequency of the converter (42) is set at a predetermined decreasing frequency slope, from a predetermined frequency spacing ($\Delta f_{down}$) under the line frequency ($f_{Netz}$) to an idle mode frequency (25 Hz).

8. A method as claimed in claim 1 for a conveyor installation which can be switched between standstill, load and idle mode, where the frequency converter (42) is set to a zero output frequency while the conveyor installation is at a standstill, and during the switch-over of the conveyor from standstill to load operation, the frequency converter (42) is made to rise at a predetermined slope angle from the zero output frequency to a predetermined frequency spacing ($\Delta f_{up}$) above the line frequency ($f_{Netz}$).

9. A method as claimed in claim 1, where an adjustment of the output frequency of converter (42) to the predetermined frequency spacing ($\Delta f_{up}$, $\Delta f_{down}$) with respect to the line frequency ($f_{Netz}$) is performed.

10. A method as claimed in claim 9, where during a switch-over of the conveyor installation from standstill to load operation the output frequency of converter (42) is first set to rise to a predetermined frequency spacing under the line frequency ($f_{Netz}$) at a steeper angle, and then at less steep an angle to the predetermined frequency spacing ($\Delta f_{up}$) above line frequency ($f_{Netz}$).

11. An electrical controller for controlling the drive of a line voltage connection (Netz) with an essentially constant line frequency ($f_{Netz}$), a drive motor (26) and a conveyance demand signal generator (48) which signals the demand to switch the operating mode between the load and the idle mode of a switchable conveyor installation in the form of an escalator (10) or a moving sidewalk, comprising: a frequency converter (42) whose output frequency can be adjusted; a controllable switch-over installation (K1, K2) with a load operation mode in which the drive motor (26) is directly coupled to a line voltage connection (Netz), and an idle mode in which the drive motor (26) is coupled to the line voltage connection (Netz) via the frequency converter (42); a synchronizer (44) whereby the output frequency of the converter (42) can be adjusted, and the output voltages of the line connection (Netz) and the frequency converter (42) are comparable with respect to frequency and phase position; the frequency converter (42) can be set for an output frequency that has a predetermined frequency spacing ($\Delta f_{up}$, $\Delta f_{down}$) from the line frequency ($f_{Netz}$); and at the time ($t_1$, $t_4$) after a switch-over demand has been signalled, when the output frequency of the converter (42) has reached both the predetermined frequency spacing ($\Delta f_{up}$, $\Delta f_{down}$) from the line frequency ($f_{Netz}$), as well as a predetermined phase spacing between the output voltages of the frequency converter (42) and the line voltage connection (Netz), a switch-over signal (SP) can be sent to the switch-over installation (K1, K2).

12. A controller as claimed in claim 11, where the switch-over installation (K1, K2) has a first controllable switching device (K1) which connects the drive motor (26) to the frequency converter (42), and a second switching device (K2) which connects the drive motor (26) to the line voltage connection (Netz);

only one of the two switching installations (K1, K2) at a time can be set to conduct; and the respective non-conducting switching device (K1, K2) can only be switched ON after a predetermined zero current time ($\Delta t_i$) after the until then conducting switching installation (K1, K2) has been switched OFF.

13. A controller as claimed in claim 12, in which both switch-over devices (K1, K2) are blocked from each other so that the respective non-conducting switching device (K1, K2) can only be changed into the conducting mode after the zero current time ($\Delta t_i$) since the non-conducting mode of the previously conducting switching device (K1, K2) has been reached.

14. A controller as claimed in claim 13, in which the synchronizer (44) is designed to emit the switch-over signal (SP) for changing the switching device (K1, K2) into the respective other mode, with a lead time that corresponds to the zero current time ($\Delta t_i$) with respect to time ($t_3$, $t_6$), when the non-conducting switching device (K1, K2) must become conducting.

15. A controller as claimed in claim 13, where each of the two switching devices (K1, K2) has an inherent switch-off delay ($\Delta t_d$) with respect to time ($t_1$, $t_4$) upon receiving a switch-off signal, and the synchronizer (44) is designed to emit the switch-over signal (SP) for changing the switching device (K1, K2) into the respective other mode, with a lead time that corresponds to the sum of the switch-off delay time ($\Delta t_d$) and the zero current time ($\Delta t_i$) with respect to time ($t_3$, $t_6$), when the non-conducting switching device (K1, K2) must become conducting.

16. A controller as claimed in claim 15, in which the synchronizer (44) is designed to set the output frequency of the converter (42) to a frequency spacing ($\Delta f_{up}$, $\Delta f_{down}$) from the line frequency ($f_{main}$), which corresponds to the decrease in the RPM of drive motor (26) during the respective zero current time ($\Delta t_i$).

17. A controller as claimed in claim 16, in which the synchronizer (44) is designed to set the predetermined phase spacing to a value which corresponds to the phase change of the motor terminal voltage during the lead time, so that at the end of the lead time there is an essential match between the phase positions of the motor terminal voltage and the frequency converter's output voltage.

18. A controller as claimed in claim 17, in which the synchronizer (44) is designed so that when the conveyor installation is switched from load operation to the idle mode, it sets the frequency converter (42) to an idle mode frequency at a predetermined decreasing frequency angle from a predetermined frequency spacing ($\Delta f_{down}$) under the line frequency ($f_{main}$).

19. A controller as claimed in claim 18, for a conveyor installation which can be switched between standstill, load operation and idle mode.

20. A controller as claimed in claim 19, which is designed to adjust the frequency converter (42) from the standstill of the conveyor installation to a zero output frequency, and its synchronizer (44) is designed so that when the conveyor installation is switched from the standstill to load operation, it sets the frequency converter (42) to rise at a predetermined angle from the zero output frequency to a predetermined freuency spacing ($\Delta f_{up}$) above the line frequency ($f_{Netz}$).

21. A controller as claimed in claim 20, in which the synchronizer (44) is designed to bring about an adjustment of the output frequency of the converter (42) to a predetermined frequency spacing ($\Delta f_{up}$, $\Delta f_{down}$) with respect to line frequency ($f_{Netz}$).

22. A controller as claimed in claim 21, in which the synchronizer (44) is designed so that when the conveyor installation is switched from standstill to load operation, it first sets a steeper rising angle up to a predetermined frequency distance ($f_{Netz}$–1.5 Hz) under the line frequency ($f_{Netz}$), and then sets the further rise to the predetermined frequency spacing ($\Delta f_{up}$) above the line frequency ($f_{Netz}$) at an angle which is less steep.

* * * * *